US012482925B2

(12) United States Patent
Liao et al.

(10) Patent No.: US 12,482,925 B2
(45) Date of Patent: Nov. 25, 2025

(54) ANTENNA MODULE AND BASE STATION SYSTEM

(71) Applicant: HUAWEI TECHNOLOGIES CO., LTD., Guangdong (CN)

(72) Inventors: Dashuang Liao, Shenzhen (CN); Guanxi Zhang, Shanghai (CN); Liqiao Jing, Shenzhen (CN); Ni Ma, Shanghai (CN); Bojie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 18/343,939

(22) Filed: Jun. 29, 2023

(65) Prior Publication Data

US 2023/0344115 A1 Oct. 26, 2023

Related U.S. Application Data

(63) Continuation of application No. PCT/CN2020/142429, filed on Dec. 31, 2020.

(51) Int. Cl.
*H01Q 21/28* (2006.01)
*H01Q 1/24* (2006.01)

(52) U.S. Cl.
CPC ............ *H01Q 1/246* (2013.01); *H01Q 21/28* (2013.01)

(58) Field of Classification Search
CPC .......... H01Q 1/246; H01Q 1/521; H01Q 5/42; H01Q 15/0013; H01Q 19/108; H01Q 21/28
See application file for complete search history.

(56) References Cited

U.S. PATENT DOCUMENTS

2018/0269577 A1* 9/2018 Kosaka .................... H01Q 5/48
2019/0267711 A1 8/2019 O'Brien et al.
2020/0328503 A1* 10/2020 Li .......................... H01Q 5/307

FOREIGN PATENT DOCUMENTS

CN 103490175 A 1/2014
CN 106299724 A 1/2017
CN 111224222 A 6/2020
CN 111276792 A 6/2020
(Continued)

OTHER PUBLICATIONS

Extended European Search Report issued in EP20967868.9, dated Jan. 9, 2024, 7 pages.
(Continued)

*Primary Examiner* — Hoang V Nguyen

(57) ABSTRACT

An antenna module and a base station system are disclosed. The antenna module may transmit an electromagnetic wave of a specific frequency band. The base station system includes: a signal tower, a first antenna module, and a second antenna module. The first antenna module and the second antenna module are separately fixed at the signal tower, and share a same antenna installation platform on the signal tower; a distance between a center point of the first antenna module and the signal tower is less than a distance between a center point of the second antenna module and the signal tower. The solutions can enable the base station system to implement multi-band coverage. The first and second antenna modules in the system can operate independently without affecting each other, and can be mounted and disassembled separately.

15 Claims, 8 Drawing Sheets

(56) References Cited

FOREIGN PATENT DOCUMENTS

| | | | |
|---|---|---|---|
| JP | 3462102 | B2 | 11/2003 |
| WO | 2013082816 | A1 | 6/2013 |

OTHER PUBLICATIONS

Ying Liu, et al: A Compact Dual-band Dual-polarized Antenna with Filtering Structures for Sub-6 GHz Base Station Applications 1 2018.total 5 pages.

International Search Report and Written Opinion issued in PCT/CN2020/142429, dated Sep. 28, 2021, 10 pages.

* cited by examiner

Top view

ANTENNA MODULE AND BASE STATION SYSTEM

CROSS-REFERENCE TO RELATED APPLICATIONS

This application is a continuation of International Application No. PCT/CN2020/142429, filed on Dec. 31, 2020, the disclosure of which is hereby incorporated by reference in its entirety

TECHNICAL FIELD

The present invention relates to the field of communication technologies, and in particular, to an antenna module, a base station, and a system.

BACKGROUND

With rapid development of 5G and maturing of commercial use, an antenna form in a base station becomes more complex, and operating frequency bands also increase. When a quantity of sites for base station deployment is limited, costs of renting an antenna installation platform resource of the base station by a communication operator gradually increase. In addition, with priority development of 4G, favorable mounting positions on a large number of sites are occupied. Consequently, 5G antenna coverage is limited. Therefore, how to achieve a higher site sharing rate and more efficient antenna installation platform utilization without affecting an existing network service is a problem that needs to be resolved in this field.

A method used in a conventional technology is to package antennas of two frequency bands in an integrated manner. Specifically, an active antenna and a passive antenna are disposed side by side, to share the antenna installation platform resource of the base station, and ensure that surfaces of the active antenna and the passive antenna are basically parallel, to minimize mutual influence between the two antennas.

This design can extend a frequency band range of an antenna, implements multi-band and multi-mode, solves a problem of lack of an antenna installation platform resource, and reduces costs of renting the antenna installation platform resource. However, this leads to a large amount of the antenna installation platform resource occupied by the antenna, low utilization, and greater wind resistance. In addition, in this technical solution, an antenna module needs to be reprocessed, and the existing antenna module cannot be used. Consequently, costs of designing the antenna are increased. In addition, once the antenna module is processed, a combination of dipoles in the antenna is fixed. Requirements of variable mounting environments cannot be met.

Another method in the conventional technology is to use a compact dual-band dual-polarized antenna filtering structure to design an antenna. A purpose of this solution is to place a high-frequency dipole in a gap of a low-frequency dipole, so that antennas of different frequency bands share an antenna installation platform. In addition, a filtering structure is introduced between two dipoles to reduce coupling between the two dipoles, so that the two dipoles can maintain their electromagnetic characteristics. However, this solution also has problems that the antenna module needs to be reprocessed and the requirements of the variable mounting environments cannot be met.

SUMMARY

To resolve the foregoing problem, embodiments of this application provide an antenna module and a base station system. The antenna module uses a component that may transmit an electromagnetic wave of a specific frequency band. Antenna modules of a plurality of frequency bands in the base station are mounted separately, and the antenna modules may share a same antenna installation platform of a signal tower. In addition, the antenna modules do not affect each other, to solve the foregoing existing problem.

According to a first aspect, the present disclosure provides an antenna module, and the antenna module includes a first antenna radiating element, a metal reflective floor, and a first antenna feed network that are sequentially connected;

- the first antenna radiating element is configured to radiate or receive an electromagnetic wave of a first operating frequency band;
- the metal reflective floor is configured to reflect the electromagnetic wave of the first operating frequency band;
- the first antenna feed network is configured to transmit an electrical signal corresponding to the electromagnetic wave of the first operating frequency band;
- the antenna module is fixed at a mounting position of a signal tower, where the mounting position is a position at which the antenna module is mounted on the signal tower; and
- a height of the antenna module on the signal tower and a height of a second antenna module on the signal tower meet a first condition, and an azimuth of the antenna module on the signal tower and an azimuth of the second antenna module on the signal tower meet a second condition, where the second antenna module is an antenna module that is on the signal tower and that shares a same antenna installation platform with the antenna module.

From above, the antenna module and the second antenna module may share a same antenna installation platform, to expand an antenna frequency band of a base station system to which the antenna module belongs.

In a possible implementation, the antenna module and the second antenna module are separately fixed at different mounting positions or a same mounting position of the signal tower, and the mounting position is a position at which the antenna module or the second antenna module is mounted on the signal tower.

In a possible implementation, the first condition includes: a difference between the height of the antenna module on the signal tower and the height of the second antenna module on the signal tower is less than a first height threshold, and the first height threshold is determined based on a height of the antenna module and a height of the second antenna module.

In a possible implementation, the second condition includes: a sector region in which the azimuth of the antenna module on the signal tower is located and a sector region in which the azimuth of the second antenna module on the signal tower is located overlap.

According to a second aspect, an embodiment of the present disclosure provides an antenna module, and the antenna module includes a second radiating element, an electromagnetic transmission floor, and a second feed network that are sequentially connected;

- the second radiating element is configured to radiate or receive an electromagnetic wave of a second operating frequency band;

the electromagnetic transmission floor is configured to reflect the electromagnetic wave of the second operating frequency band and transmit an electromagnetic wave of a first operating frequency band, where the first operating frequency band includes any operating frequency band other than the second operating frequency band; and the second feed network is configured to transmit an electrical signal corresponding to the electromagnetic wave of the second operating frequency band, and transmit the electromagnetic wave of the first operating frequency band.

From above, the antenna module and the first antenna module may share a same antenna installation platform, to expand an antenna frequency band of a base station system to which the antenna module belongs.

In a possible implementation, a transmittance of the electromagnetic transmission floor to the electromagnetic wave of the first operating frequency band is greater than a first threshold, and the first threshold is determined based on the first operating frequency band, receiving performance of a first antenna module corresponding to the first operating frequency band, and/or transmitting performance of the first antenna module.

In a possible implementation, a transmittance of the electromagnetic transmission floor to the electromagnetic wave of the second operating frequency band is less than a second threshold, and the second threshold is determined based on an operating frequency band, receiving performance, and/or transmitting performance of the antenna module.

In a possible implementation, a transmittance of the second feed network to the electromagnetic wave of the first operating frequency band is greater than a first threshold, and the first threshold is determined based on the first operating frequency band, receiving performance of a first antenna module corresponding to the first operating frequency band, and/or transmitting performance of the first antenna module.

In a possible implementation, the antenna module and the first antenna module corresponding to the first operating frequency band are separately fixed at different mounting positions or a same mounting position of the signal tower, and the mounting position is a position at which the antenna module or the first antenna module is mounted on the signal tower.

In a possible implementation, a height of the antenna module on the signal tower and a height of the first antenna module corresponding to the first operating frequency band on the signal tower meet a third condition, and an azimuth of the antenna module on the signal tower and an azimuth of the first antenna module on the signal tower meet a fourth condition, to share a same antenna installation platform on the signal tower.

In a possible implementation, the third condition includes: a difference between the height of the antenna module on the signal tower and the height of the first antenna module on the signal tower is less than a second height threshold, and the second height threshold is determined based on a height of the antenna module and a height of the first antenna module.

In a possible implementation, the fourth condition includes: a sector region in which the azimuth of the antenna module on the signal tower is located and a sector region in which the azimuth of the first antenna module on the signal tower is located overlap.

According to a third aspect, an embodiment of the present disclosure further provides a base station system, and the base station system includes a signal tower, a first antenna module, and a second antenna module;

the first antenna module and the second antenna module are separately fixed at different mounting positions or a same mounting position of the signal tower, and the mounting position is a position at which the first antenna module or the second antenna module is mounted on the signal tower;

a height of the first antenna module on the signal tower and a height of the second antenna module on the signal tower meet a fifth condition, and an azimuth of the first antenna module on the signal tower and an azimuth of the second antenna module on the signal tower meet a sixth condition, to share a same antenna installation platform on the signal tower;

a distance between a center point of the first antenna module and the signal tower is less than a distance between a center point of the second antenna module and the signal tower;

a first operating frequency band of the first antenna module is different from a second operating frequency band of the second antenna module;

the first antenna module is configured to radiate or receive an electromagnetic wave of the first operating frequency band; and the second antenna module is configured to transmit the electromagnetic wave of the first operating frequency band, and radiate or receive an electromagnetic wave of the second operating frequency band.

As described above, the first antenna module and the second antenna module in the base station system can share the same antenna installation platform. In addition, the second antenna module does not block an electromagnetic wave of the first antenna module, and the two antenna modules do not affect each other, and may work independently. At the same time, the two antenna modules are separately mounted, in this way, the two antenna modules can be flexibly mounted and removed.

In a possible implementation, a distance between the first antenna module and the second antenna module is greater than 0.1λ, and λ is a wavelength of an operating frequency band of the first antenna module.

In a possible implementation, an angle between a surface of the first antenna module and a surface of the second antenna module that are opposite to each other is between −90° and 90°.

In a possible implementation, the first antenna module includes a first antenna radiating element, a metal reflective floor, and a first antenna feed network that are sequentially connected;

the first antenna radiating element is configured to radiate or receive an electromagnetic wave of a first operating frequency band;

the metal reflective floor is configured to reflect the electromagnetic wave of the first operating frequency band;

the first antenna feed network is configured to transmit an electrical signal corresponding to the electromagnetic wave of the first operating frequency band;

the antenna module is fixed at a mounting position of a signal tower, where the mounting position is a position at which the antenna module is mounted on the signal tower; and In a possible implementation, the second antenna module includes a second radiating element, an electromagnetic transmission floor, and a second feed network that are sequentially connected;

the second radiating element is configured to radiate or receive an electromagnetic wave of a second operating frequency band;

the electromagnetic transmission floor is configured to reflect the electromagnetic wave of the second operating frequency band and transmit an electromagnetic wave of a first operating frequency band, where the first operating frequency band includes any operating frequency band other than the second operating frequency band; and the second feed network is configured to transmit an electrical signal corresponding to the electromagnetic wave of the second operating frequency band, and transmit the electromagnetic wave of the first operating frequency band.

In a possible implementation, the fifth condition includes: a difference between the height of the first antenna module on the signal tower and the height of the second antenna module on the signal tower is less than a third height threshold, and the third height threshold is determined based on a height of the first antenna module and a height of the second antenna module.

In a possible implementation, the sixth condition includes: a sector region in which the azimuth of the first antenna module on the signal tower is located and a sector region in which the azimuth of the second antenna module on the signal tower is located overlap.

BRIEF DESCRIPTION OF DRAWINGS

The following briefly describes accompanying drawings that need to be used in descriptions of embodiments or a conventional technology.

DESCRIPTION OF EMBODIMENTS

The following describes technical solutions in embodiments of the present disclosure with reference to the accompanying drawings in embodiments of the present disclosure.

In descriptions of embodiments of the present disclosure, the word such as "example", "for example" or "in an example" is used to represent giving an example, an illustration, or a description. Any embodiment or design scheme described as an "example", "for example" or "in an example" in embodiments of the present disclosure shall not be explained as being more preferred or having more advantages than another embodiment or design scheme. Exactly, use of the word such as "example", "for example" or "in an example" is intended to present a relative concept in a specific manner.

In the descriptions of embodiments of the present disclosure, the term "and/or" describes only an association relationship for describing associated objects and represents that any one of three relationships may exist. For example, A and/or B may represent the following one of three cases: Only A exists, both A and B exist, and only B exists. In addition, unless otherwise specified, the term "a plurality of" refers to two or more than two. For example, a plurality of systems means two or more systems, and a plurality of screen terminals refer to two or more screen terminals.

Moreover, a term "first" or "second" is merely intended for a purpose of description, and shall not be understood as an indication or implication of relative importance or implicit indication of an indicated technical feature. Therefore, a feature limited by "first" or "second" may explicitly or implicitly include one or more features. The terms "include", "contain", "have", and other variants thereof all mean "include but is not limited to", unless otherwise specifically emphasized in another manner.

Figure 1:
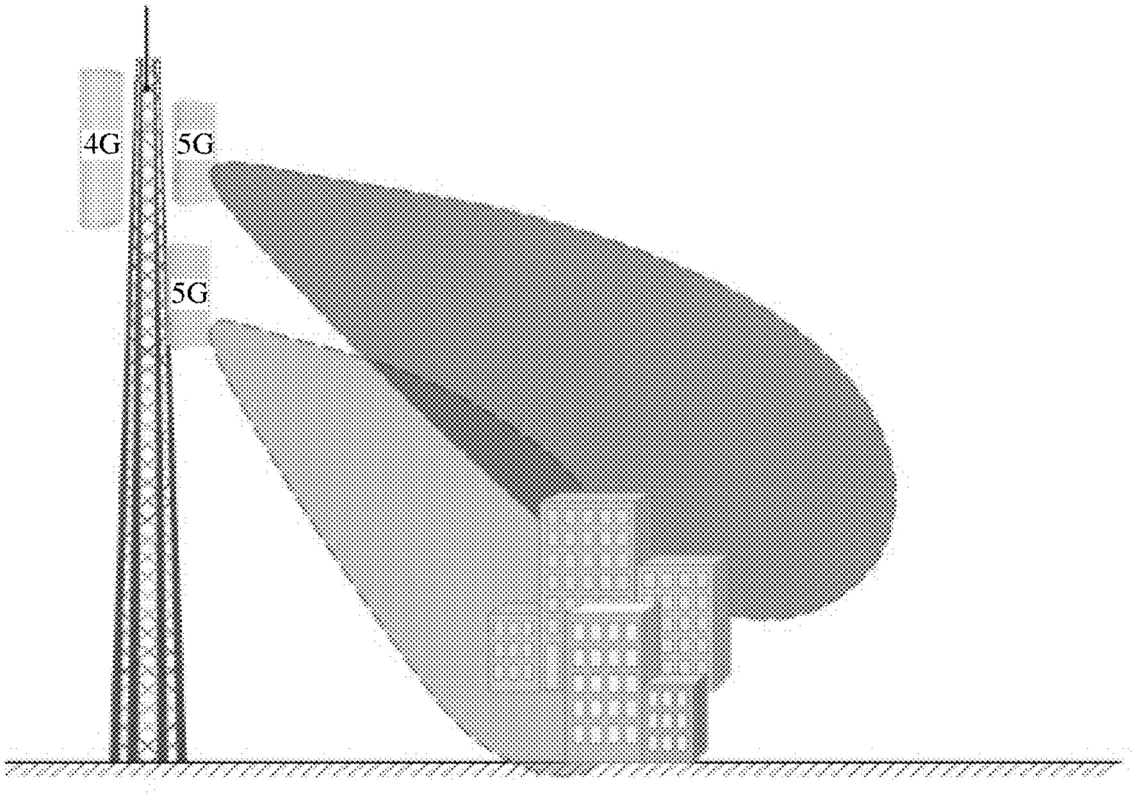
FIG. 1 is a structural diagram of a base station system on which a plurality of antennas is mounted according to the present disclosure.

FIG. 1 is a structural diagram of a base station system on which a plurality of antennas is mounted. As shown in FIG. 1, three antenna modules of different frequency bands are mounted on a signal tower in the base station system, and are located at three different mounting positions of the base station.

The base station system is a public mobile communication system and is also an interface device for a mobile terminal to access an internet. The base station system may establish a communication connection relationship with a mobile terminal in a specific range via an electromagnetic wave, and transmit information.

The base station system receives and transmits an electromagnetic wave of a corresponding frequency band via, for example, an antenna module shown in FIG. 1, to implement communication with a mobile terminal on a terminal side. The base station system is further connected to a core network side by using a transmission network, and obtains information needed by the mobile terminal from the core network side.

A transmission procedure from the core network side to the mobile terminal is used as an example to describe an information transmission process.

The base station system transmits control instructions, voice calls, or data service information from the core network side to the base station system by using the transmission network. The base station system performs baseband and radio frequency processing on the information, and then transmits the information to the antenna module by using a radio frequency feeder for radiation. The mobile terminal receives a radio wave (electromagnetic wave) radiated by the antenna module via a radio channel, and obtains information of the mobile terminal from the radio wave.

A transmission procedure from the mobile terminal to the core network side and the foregoing procedure are opposite, but have similar principles.

In addition to the signal tower and the antenna module shown in FIG. 1, the base station system further includes some infrastructures, such as a base station room or a cable. The base station room mainly includes a signal transceiver, a monitoring apparatus, a fire extinguishing apparatus, a power supply device and an air conditioning device.

The signal transceiver is configured to receive or transmit information transmitted from the antenna module or the core network side. The signal transceiver is a switching station for information transmission and includes a transmitter and a receiver.

The monitoring apparatus, the fire extinguishing apparatus, and the air conditioning device are security auxiliary apparatuses of the base station system, and provide functions such as monitoring or cooling.

In addition to the antenna module, the signal tower further includes a lightning protection and grounding system, a tower body, a foundation, a support, a cable and an auxiliary facility. Based on the shape, the signal tower can be divided into an angle steel tower, a single pipe tower, a top pole, a cable tower or other different forms.

The base station system further includes a base station controller. The base station controller includes a wireless transceiver, an antenna, and a related signal processing circuit, and is a control part of a base station subsystem. The base station controller mainly includes four components: a cell site controller (CSC), a voice channel controller (VCC), a signaling channel controller (SCC) and a multi-port interface (EMPI) for expansion.

One base station controller usually controls several base transceiver stations. By using a remote command from a transceiver station and a mobile station, the base station controller is responsible for management of all mobile communication interfaces, and is mainly responsible for allocation, release, and management of the radio channel. The transceiver station is the foregoing antenna module.

Cores of the base station controller are a switching network and a common processor (CPR). The common processor controls and manages each module in a controller, and is connected to an operation and maintenance center (OMC) by using a communication protocol. The switching network implements internal switching of a data/voice traffic channel of 64 kbit/s between interfaces. The controller is connected to a mobile switching center via an interface device digital repeater, and connected to the transceiver station via an interface device terminal controller (TCU), to form a simple communication network.

In a possible implementation, in addition to the foregoing devices, the base station system may further include a base station system: a main control unit that manages the base station system, and an intermediate radio frequency unit that is connected to the main control unit and that is configured to process an intermediate radio frequency signal, a baseband unit that is configured to process a baseband signal, and a transmission unit that is connected to the baseband unit, and is connected to a network controller via a transmission interface.

In addition, in some examples, the base station system may further include:

a mode management unit that is connected to the intermediate radio frequency unit, the main control unit, the baseband unit, and the transmission unit, and that is configured to configure, based on a networking form of the base station system in the communication network, the base station system to operate in different operating modes; and a first carrier interface and a second carrier interface, where the first carrier interface is configured to communicate with a connected upper-level device during cascading networking, and the second carrier interface is configured to communicate with a connected lower-level device during cascading networking.

A frequency band of the antenna module may be any frequency band, including a 4G frequency band and a 5G frequency band. The frequency band of the antenna module is not specifically limited in this embodiment.

4G (fourth generation mobile communication technology) is a technical improvement of 3G (third generation mobile communication technology). Compared with the 3G communication technology, a strong advantage of 4G is that a WLAN technology and the 3G communication technology are well combined to implement fast image transmission, and better quality and clearer image of a transmitted image. An application of 4G communication technology in an intelligent communication device allows a user to access an internet faster, up to 100 Mbps.

Similarly, 5G (fifth generation mobile communication technology) is a latest generation cellular mobile communication technology, and is also an extension after 4G. Performance goals of 5G are a high data rate, a reduced latency, energy saving, reduced costs, an increased system capacity, and large-scale device connectivity. A speed required in 5G specification is up to 20 Gbit/s. This can implement a wide channel bandwidth and a large-capacity MIMO, and further improves an internet access speed.

Each generation of communication technology generally has a plurality of operating frequency bands. For 4G, frequency bands include frequency bands of 1880 to 1900 MHZ, 2320 to 2370 MHz, and 2575 to 2635 MHz of China mobile, frequency bands of 2300 to 2320 MHz and 2555 to 2575 MHz of China unicom, and frequency bands of 2370 to 2390 MHz and 2635 to 2655 MHz of China telecom.

For 5G, frequency bands include frequency bands of 2515 MHz to 2675 MHz and 4800 MHz to 4900 MHz of China mobile, a frequency band of 3500 MHz to 3600 MHz of China unicom, and a frequency band of 3400 MHz to 3500 MHz of China telecom.

The antenna module is a converter that applies the foregoing mobile communication technology. The converter may convert a pilot wave propagated on a transmission line into an electromagnetic wave propagated in an unbounded medium (usually free space), or perform reverse conversion. An operating frequency band of the electromagnetic wave is a frequency band corresponding to the mobile communication technology.

It is well known that an electromagnetic wave is an oscillating particle wave derivatively emitted, in space, by an electric field and a magnetic field that are perpendicular to each other and are in a same phase, and the electromagnetic wave has wave-particle duality. The electromagnetic wave moves in a form of a wave in space by using the electric field and the magnetic field that are perpendicular to each other and oscillate in a same direction. A propagation direction of the electromagnetic wave is perpendicular to a plane formed between the electric field and the magnetic field. The Electromagnetic wave has a fixed rate in a vacuum, and has a speed of light.

The Electromagnetic wave is a type of motion form of an electromagnetic field. Electricity and magnetism are two sides of a same body. A changing electric field produces a magnetic field (that is, a current produces the magnetic field), and a changing magnetic field produces an electric field. The changing electric field and the changing magnetic field constitute an inseparable unified field, which is referred to as the electromagnetic field. Propagation of a changing electromagnetic field in space forms an electromagnetic wave. A Change of electromagnetism is like a gentle breeze on a water surface to generate a water wave. Therefore, the change is referred to as an electromagnetic wave, and is often referred to as an electric wave.

Generally, a conventional antenna module includes three-layer structures: an antenna radiating element, a metal reflective floor, and an antenna feed network.

The antenna radiating element is a unit that forms a basic structure of the antenna module, and can effectively radiate or receive a radio wave. Specifically, the antenna radiating element is configured to convert an electrical signal into an electromagnetic wave of a specific operating frequency band and radiate the electromagnetic wave, and convert a received electromagnetic wave into an electrical signal and transmit the electrical signal to the antenna feed network.

The metal reflective floor is located between the antenna radiating element and the antenna feed network, and is configured to reflect the electromagnetic wave radiated by the antenna radiating element.

The antenna feed network is configured to transmit an electrical signal corresponding to an electromagnetic wave, including sending an electrical signal transmitted from a transmitter to the antenna radiating element, and sending an electrical signal transmitted from the antenna radiating element to a receiver.

The antenna radiating element may be a standard opposite element. In a radiation direction of the element, there are two pairs of dipoles that are fed in an equal-amplitude and in-phase manner. The dipole pairs are standard half-wave dipoles, and are fed via a coaxial line. The antenna diameter has large diameter area and high radiation efficiency. The antenna radiating element may use a hertz electric dipole, a hertz magnetic dipole or a Huygens element radiator.

The metal reflective floor is configured to reflect the electromagnetic wave radiated by the antenna radiating element.

In a possible implementation, the metal reflective floor may be formed by combining and arranging a plurality of dual-band tunable structural unit arrays. A dual-band tunable structural unit includes a metal copper sheet, a first-layer dielectric plate, a dual dielectric film, a second-layer dielectric plate and a ground plate. The metal copper sheet faces the antenna. The ground plate is back to the antenna. The metal copper sheet includes a square copper sheet and a square ring copper sheet. The dual dielectric film includes an inner composite dielectric film and an outer composite dielectric film, and there is an air gap between the inner composite dielectric film and the outer composite dielectric film.

In a possible implementation, the dielectric plate may be a metal plate made of a metal material, or a plastic plate whose surface is coated with a metal layer.

The antenna feed network is also an important part of the antenna module. The antenna feed network is connected to a port and an array unit of the antenna module to form a channel for transmitting a radio frequency signal, and implements functions such as impedance matching, amplitude and phase distribution.

In a possible implementation, a structure of the antenna feed network may include: an outer conductor of a main feeder and an inner conductor that is of the main feeder and that is located in the outer conductor of the main feeder. Two inner conductors of the main feeder are connected via a conductor component. One side of the outer conductor of the main feeder is an open structure.

In a possible implementation, a structure of the antenna feed network may include: an outer conductor of a feed network and an inner conductor of a feed network.

The outer conductor of the feed network is disposed on a back side of a reflective floor. The outer conductor of the feed network includes a plurality of conductors. A gap is disposed between adjacent conductors in the plurality of conductors, and the inner conductor of the feed network is disposed in the gap. The inner conductor of the feed network is an integrated structure at a power splitter and a corner.

In a possible implementation, a structure of the antenna feed network may include two sub-differential feed networks. The two sub-differential feed networks are respectively placed on two opposite surfaces of the metal reflective floor, and differentially feed power to a dual-polarized antenna radiating element, to implement miniaturization of a dual-polarized differential feed network.

Different structures may be used for the antenna radiating element, the metal reflective floor, and the antenna feed network in different mounting environments. Structures of the antenna radiating element, the metal reflective floor, and the antenna feed network are not specifically limited in this embodiment, provided that a function of the antenna module recorded in this embodiment can be implemented.

Based on the foregoing descriptions, the three antenna modules in FIG. 1 are devices to which different frequency bands in the foregoing mobile communication technology are applied, for example, one antenna module that supports a 4G frequency band and two antenna modules that support different 5G frequency bands.

An antenna module that supports a 5G frequency band is used as an example. An electromagnetic wave radiated by the antenna module covers a region in a specific range around the signal tower, and a coverage distance of the antenna module is related to transmitting power of the antenna module. When a user in the coverage range requests to access data via a wireless communication device, an electromagnetic wave of an operating frequency band of the antenna module is sent to the antenna module. The antenna module receives the electromagnetic wave requested for access, converts the received electromagnetic wave, and feeds a converted electromagnetic wave to the receiver through a feeder. The receiver obtains corresponding data, and sends the corresponding data to the antenna module through the feeder. The antenna module sends the data to the user in a form of the electromagnetic wave.

The wireless communication device may be a device that can implement wireless communication, such as a mobile phone or a tablet. The wireless communication device is not specifically limited in this embodiment. In addition, a baseband chip that may transmit and receive baseband signals needs to be mounted in the wireless communication device. The baseband chip may synthesize baseband signals to be transmitted, and decode a received baseband signal. When a baseband signal is transmitted, audio signal is compiled into baseband code. When a signal is received, the baseband code is decoded into the audio signal. In addition, the baseband chip is also responsible for compiling address information, text information, and image information.

The baseband chip is an SOC having complex integration. A mainstream baseband chip supports a plurality of network standards. To be specific, one baseband chip supports all mobile networks and wireless network standards, including 2G, 3G, 4G, or Wi-Fi. A multi-mode mobile terminal may implement seamless roaming between a plurality of mobile networks and wireless networks worldwide. Currently, basic structures of most baseband chips are a microprocessor and a digital signal processor. The microprocessor is a control center of the whole chip. The most of baseband chips use an ARM core, and a DSP subsystem is responsible for baseband processing.

A smartphone is used as an example. A baseband chip arranged in the smartphone may be understood as a SoC chip having a complex structure, and may communicate with a surrounding antenna module by radiating or receiving an electromagnetic wave of a specific operating frequency band. The chip has a plurality of functions, and normal operation of each function is configured and coordinated via the microprocessor. The complex chip is centered on an ARM microprocessor. The chip controls and configures each peripheral functional module around the ARM microprocessor via a dedicated bus (an AHB bus) of the ARM microprocessor, including GSM, Wi-Fi, a GPS, a Bluetooth, a DSP, a memory, and the like. In addition, the functional modules each have an independent memory and address space, and functions of the functional modules are independent of each other, and do not affect each other.

The smartphone further includes an antenna, a mobile communication module, and a modem.

For example, the antenna is configured to transmit and receive electromagnetic wave signals radiated by the antenna module of the base station system.

The mobile communication module may provide a solution that is applied to the smartphone, to wireless communication including 2G, 3G, 4G, 5G, or the like. The mobile communication module may include at least one filter, a switch, a power amplifier, a low noise amplifier (LNA), and the like.

The modem may include a modulator and a demodulator.

When a radiation angle of the antenna module is 120°, only three antenna modules can be mounted on one horizontal plane of a base station in consideration of an actual mounting requirement. Therefore, this embodiment provides a multi-band separated base station system. In the system, the antenna module is mounted on a same antenna installation platform, to break through a limit on a quantity of antenna modules, and implement a purpose of expanding a frequency band of the base station system.

Figure 2:
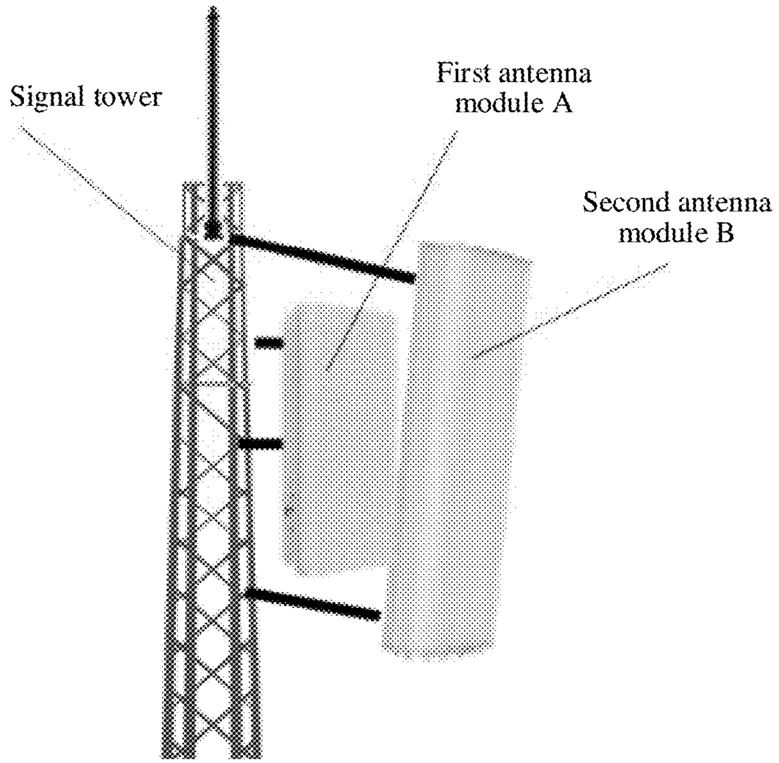
FIG. 2 is a structural diagram of a base station system according to an embodiment of the present disclosure.

FIG. 2 is a structural diagram of a base station system according to an embodiment of the present disclosure. As shown in FIG. 2, the base station system has a multi-band separated antenna module architecture, including a signal tower, a first antenna module A, and a second antenna module B. The antenna module A and the antenna module B share a same antenna installation platform of the signal tower, to save antenna installation platform resources. The antenna module A and the antenna module B use antenna devices of different frequency bands, to expand a frequency band.

In a possible implementation, the antenna modules A and the antenna module B are mounted separately. To be specific, the antenna module A and the antenna module B are separately fixed at different mounting positions of the signal tower, and the antenna module A is closer to a base station than the antenna module B is. This arrangement further enables flexible assembly and disassembly of the two antenna modules.

In a possible implementation, the antenna module A and the antenna module B may be combined and mounted. To be specific, the antenna module A and the antenna module B are first combined and fixed, and then a combined module is mounted at a mounting position of the signal tower.

To share the same antenna installation platform of the signal tower in the foregoing implementation, the antenna module A and the antenna module B cannot be far away from each other. Therefore, heights and azimuths of the two modules on the signal tower need to be limited. Therefore, a height of the antenna module A on the signal tower and a height of the antenna module B on the signal tower need to meet a specific condition. In addition, an azimuth of antenna module A on the signal tower and an azimuth of antenna module B on the signal tower need to meet a requirement of a specific range.

In this embodiment, conditions on which the two antenna modules share the same antenna installation platform are set as follows:

Condition 1: A height difference between the two antenna modules on the signal tower is less than a height threshold. When a height of an antenna module on the signal tower is calculated by using a center point of the antenna module as a reference point, the height threshold is a half of a sum of the heights of the two modules.

Figure 3:
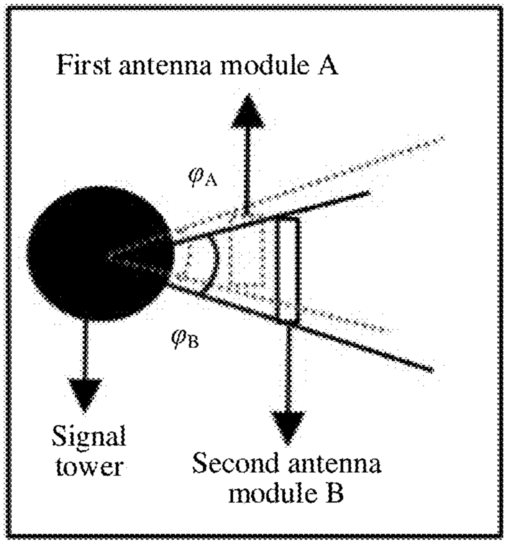
FIG. 3 is a top view of a base station system according to an embodiment of the present disclosure.

Condition 2: Sector regions in which the azimuths of the two antenna modules on the signal tower overlap. FIG. 3 shows a top view of two antenna modules on a signal tower. As shown in FIG. 3, the two antenna modules are viewed from above the signal tower. A dotted line box represents an antenna module A, and an angle formed between two dotted lines is an azimuth $\varphi_A$ of the antenna module A on the signal tower. A solid line box represents an antenna module B, and an angle formed between two solid lines is an azimuth $\varphi_B$ of the antenna module B on the signal tower.

The overlap of the two sector regions described in Condition 2 above is a feature that represents an ability to share a same antenna installation platform, and does not emphasize that the two sector regions need to completely overlap together. For example, when 30% of the two sector regions overlap, an effect of sharing an antenna installation platform may be implemented, and it may be determined that the two sector regions overlap.

The azimuth in this embodiment is an azimuth in a spherical coordinate system established by using a bottom center of the signal tower as an origin. Specifically, the antenna module A is used as an example. Refer to FIG. 3. The azimuth $\varphi_A$ of the antenna module A is an angle formed between connection lines of two edge points below the module A and the origin on a projection plane. The two edge points are midpoints of edges on two sides below the module A.

In this embodiment, for ease of description, an operating frequency band of the antenna module A is referred to as a first operating frequency band, and an operating frequency band of the antenna module B is referred to as a second operating frequency band.

The antenna module A radiates or receives an electromagnetic wave of the first operating frequency band. The antenna module B transmits the electromagnetic wave of the first operating frequency band, and radiates or receives an electromagnetic wave of the second operating frequency band.

It should be further noted that, in the foregoing manner of disposing the antenna module A and the antenna module B on the signal tower, the antenna module B cannot affect operation of the antenna module A. In other words, an effect of transmitting the first operating frequency band by the antenna module B is implemented. Therefore, a structure of the antenna module B is different from that of the antenna module A. In addition, there are some particularities in a position relationship between the antenna module A and the antenna module B. In this embodiment, the two modules operate independently and do not affect each other from two aspects: the position relationship between the antenna module A and the module B and internal structures of the antenna module A and the module B.

For example, the following first describes the position relationship between the antenna module A and the module B in a base station system in this embodiment.

This aspect includes a distance and an angle between the antenna module A and the antenna module B.

First, to ensure that the antenna module A and the antenna module B can be independently decoupled from each other, in this embodiment, the distance between the antenna module A and the antenna module B is set based on a wavelength of the operating frequency band of the antenna module A. The distance between the antenna module A and the antenna module B is greater than 0.1λ, and λ is the wavelength of the operating frequency band of the antenna module A.

In addition, in a possible implementation, a distance between a center point of the antenna module A and the signal tower is less than a distance between a center point of the antenna module B and the signal tower.

Second, the angle between a surface of the antenna module A and a surface of the antenna module B that are opposite to each other also affects operation of the antenna module A, and needs to be adjusted. In this embodiment, the angle between the surface of the antenna module A and the surface of the antenna module B that are opposite to each other ranges from −90° to 90°.

The following describes internal structures of the antenna module A and the antenna module B in this embodiment.

In this embodiment, the antenna module A may use a structure of a first antenna radiating element, a metal reflective floor, and a first antenna feed network. The first antenna radiating element, the metal reflective floor, and the first antenna feed network are sequentially connected.

The first antenna radiating element radiates or receives the electromagnetic wave of the first operating frequency band. The metal reflective floor reflects the electromagnetic wave of the first operating frequency band. The first antenna feed network transmits an electrical signal corresponding to the electromagnetic wave of the first operating frequency band.

It may be learned from the foregoing descriptions that the antenna module A is between the base station and the antenna module B. If the antenna module B is not reconstructed, and the antenna module B uses the same structure as the antenna module A, the antenna module B hinders the antenna module A from radiating and receiving an electromagnetic wave. An operating effect of the antenna module A is affected.

In this embodiment, to minimize impact of the antenna module B on performance of the antenna module A, the antenna module B is specially designed. Specifically, a reflective floor in a conventional antenna module structure is configured as an electromagnetic transmission floor, and a feed network is configured as a feed network that may transmit an electromagnetic wave. An electromagnetic transmission floor and a feed network of the antenna module B may transmit the electromagnetic wave of the operating frequency band of the antenna module A. To be specific, an incident angle of a transmitted electromagnetic wave on the electromagnetic transmission floor and the feed network of the antenna module B is arbitrary.

As described above, the antenna module B in this embodiment includes: a second radiating element, the electromagnetic transmission floor, and a second feed network. The second radiating element, the electromagnetic transmission floor, and the second feed network are sequentially connected.

The second radiating element radiates or receives the electromagnetic wave of the second operating frequency band. The electromagnetic transmission floor may reflect the electromagnetic wave of the second operating frequency band, and may transmit the electromagnetic wave of the first operating frequency band. The second feed network transmits an electrical signal corresponding to the electromagnetic wave of the second operating frequency band, and transmits the electromagnetic wave of the first operating frequency band.

To implement a transmission effect of the electromagnetic transmission floor to the electromagnetic wave of the first operating frequency band of the antenna module A, a transmittance of the electromagnetic transmission floor to the electromagnetic wave of the operating frequency band of the antenna module A is greater than a first threshold, and a transmittance of a reconstructed feed network of the antenna module B is also greater than the first threshold.

The first threshold needs to be set based on the operating frequency band, radiation performance, and/or receiving performance of the antenna module A. In addition, the electromagnetic transmission floor further needs to reflect the electromagnetic wave of the operating frequency band of the antenna module B. Therefore, a transmittance of the electromagnetic transmission floor to the antenna module B is less than a second threshold, and the second threshold is set based on the operating frequency band, radiation performance, and/or receiving performance of the antenna module B. In this embodiment, the first threshold is −0.5 dB, and the second threshold is −10 dB.

The following further describes, with reference to the accompanying drawings, structures of the antenna module A and the antenna module B in this embodiment.

Figure 4:
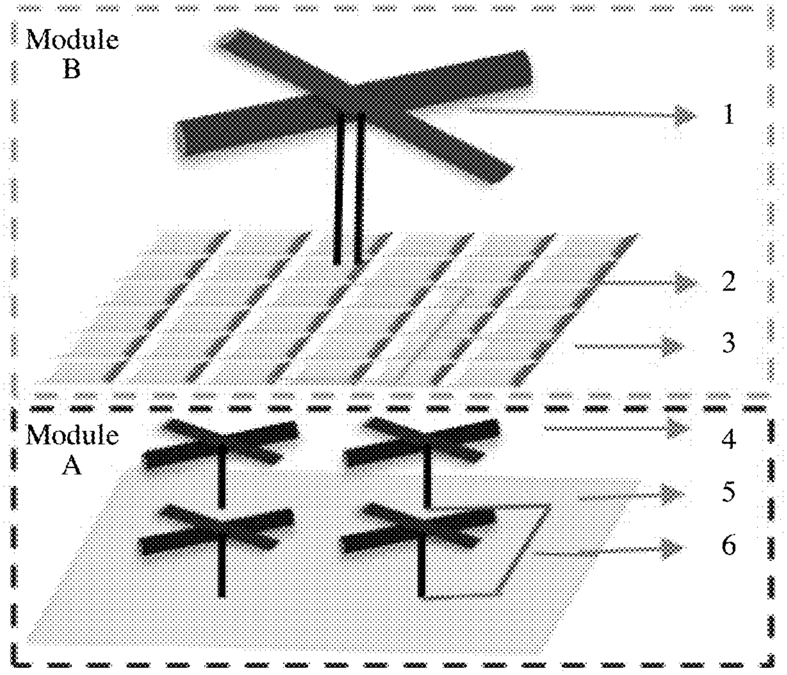
FIG. 4 is a schematic structural diagram of an antenna module A and an antenna module B in a base station system according to an embodiment of the present disclosure.

FIG. 4 is a schematic structural diagram of an antenna module A and an antenna module B in a base station system according to an embodiment. As shown in FIG. 4, in a direction looking from one side of the antenna module B towards a signal tower, the antenna module B includes: an antenna radiating element 1, an electromagnetic transmission floor 2, and a feed network 3 that are sequentially connected, and the antenna module A includes: an antenna radiating element 4, a metal reflective floor 5, and a feed network 6 are sequentially connected. Structures of the antenna radiating element 1 and the antenna radiating element 4 may be the same or different, and may be selected based on an actual mounting environment. The feed network 3 has a capability of transmitting an electromagnetic wave of an operating frequency band of the antenna module A.

Next, for example, a route of an electromagnetic wave between the antenna module A and the antenna module B and a corresponding effect generated by the foregoing special design is described in detail.

Figure 5:
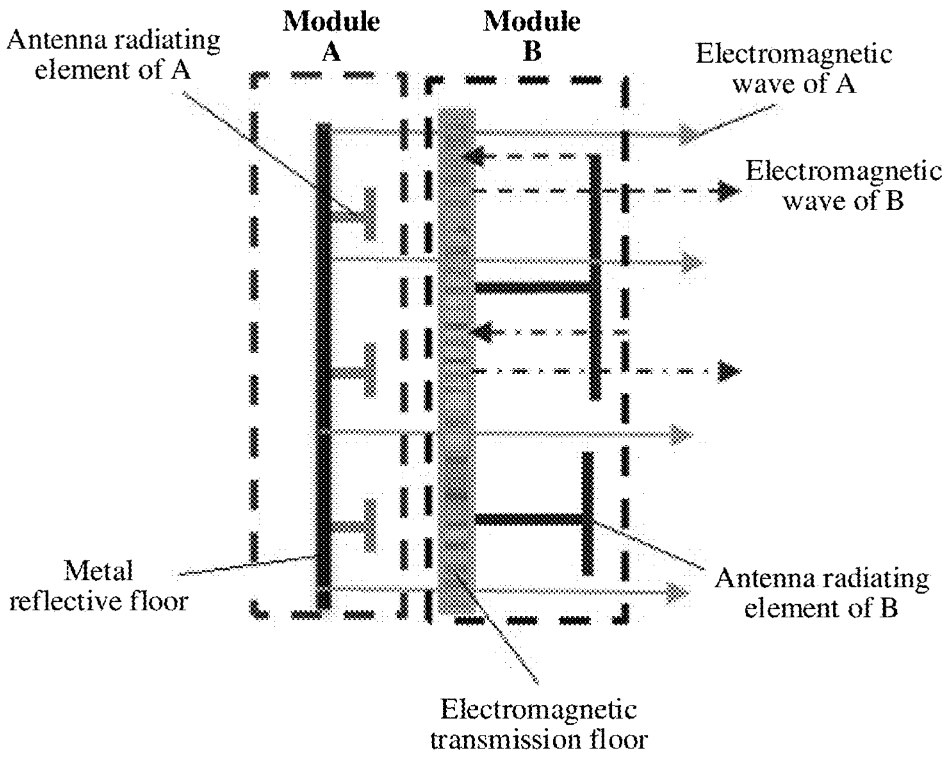
FIG. 5 is a road map of electromagnetic waves between an antenna module A and an antenna module B in a base station system according to an embodiment of the present disclosure.

FIG. 5 shows a road map of an electromagnetic wave between two antenna modules in a base station according to an embodiment of the present disclosure. As shown in FIG. 5, after an electromagnetic transmission floor of an antenna module B radiates an electromagnetic wave from an antenna radiating element of the antenna module B, and reflects the electromagnetic wave out. In addition, the electromagnetic transmission floor does not block an electromagnetic wave of an operating frequency band of an antenna module A. A feed network in the antenna module B also transmits the electromagnetic wave of the operating frequency band of the antenna module A, so that the antenna module B does not affect normal operation of the antenna module A.

The electromagnetic wave of the operating frequency band of the antenna module A is generated by an antenna radiating element in the antenna module A, and an electromagnetic wave of an operating frequency band of the antenna module B is generated by an antenna radiating element in the antenna module B.

Next, an effect in which the antenna module A and the antenna module B do not affect each other is described in this embodiment with reference to a polarization pattern of an antenna module. Polarization patterns listed below are polar coordinate patterns.

Figure 6A:
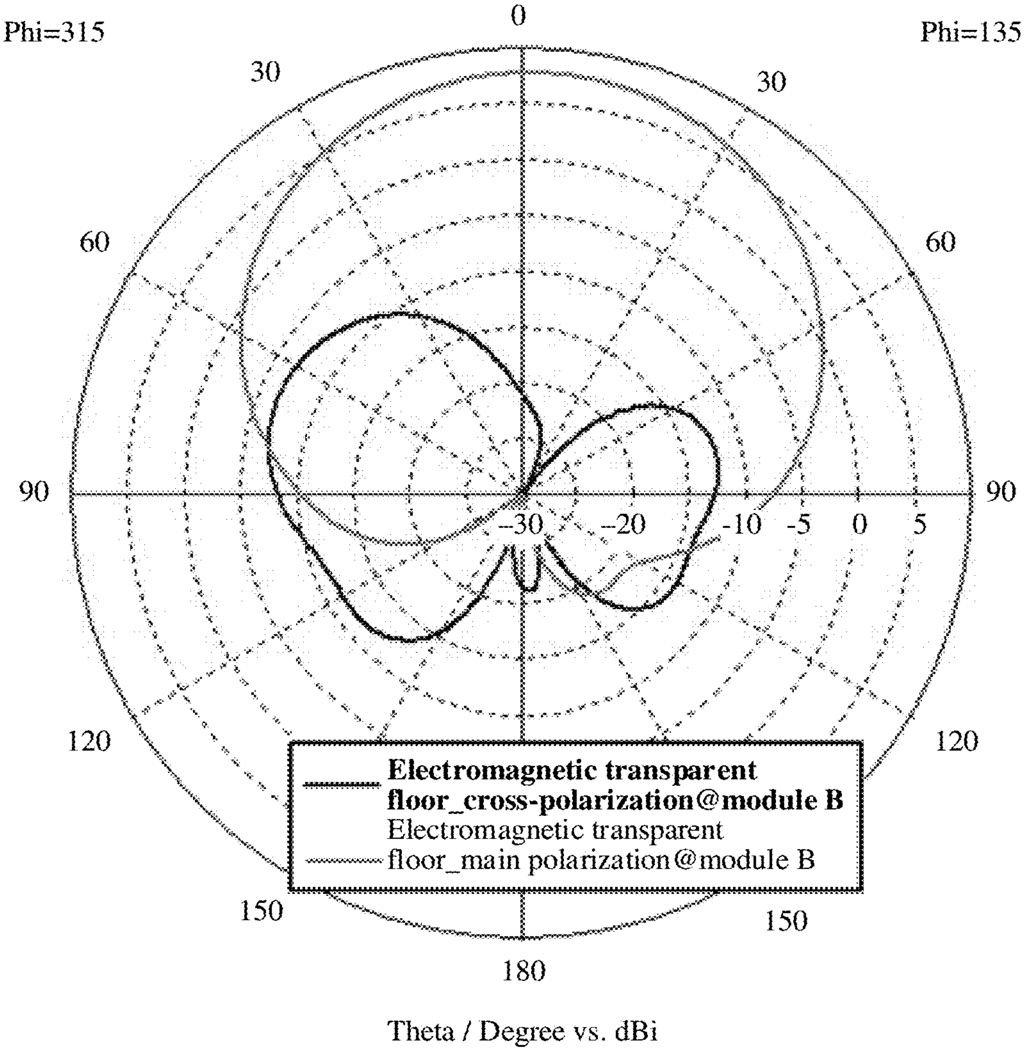
FIG. 6*a* is a polarization pattern in which an antenna module B uses an electromagnetic transmission floor in a base station system according to an embodiment of the present disclosure.
Figure 6B:
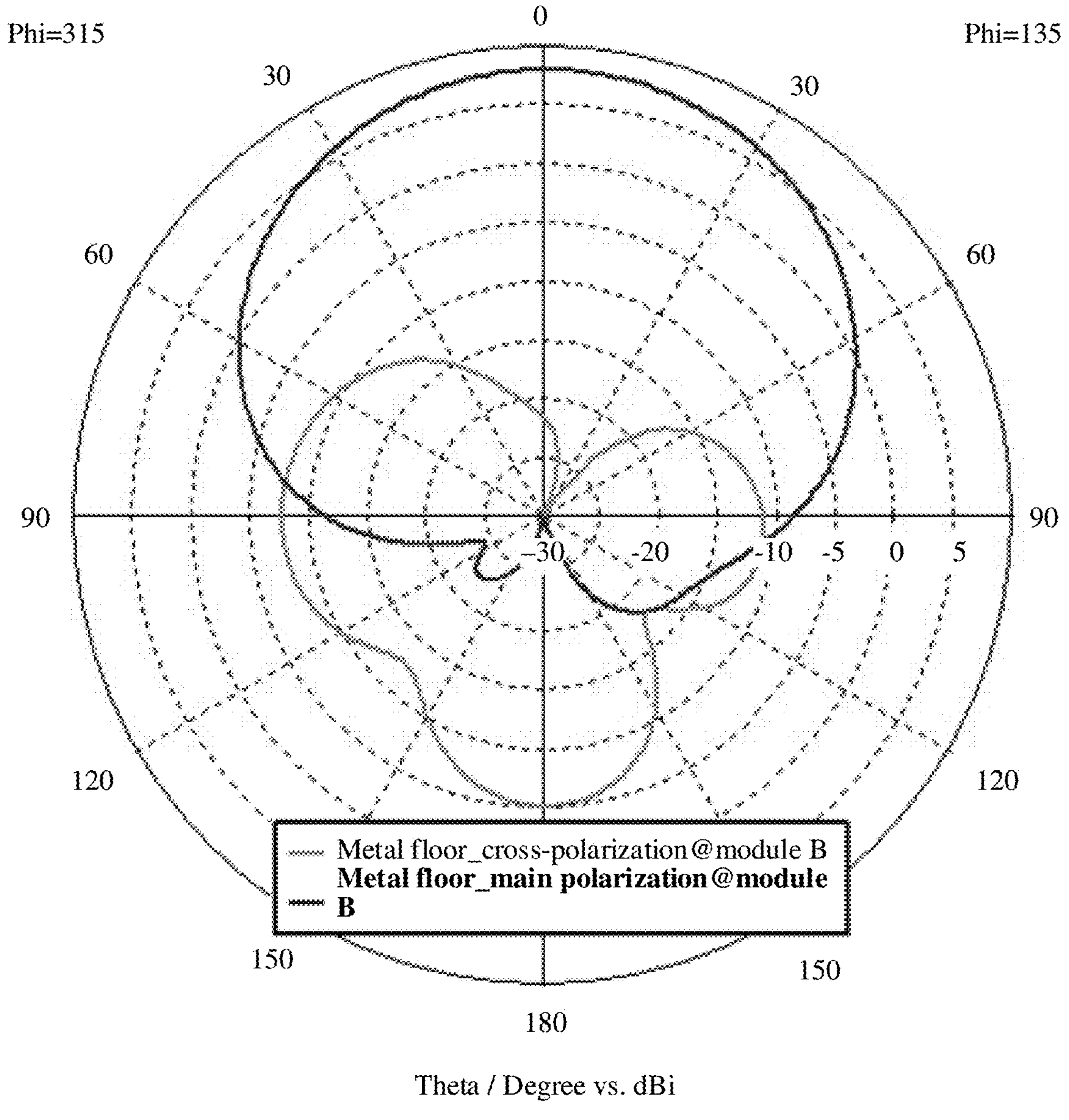
FIG. 6*b* is a polarization pattern in which an antenna module B uses a metal reflective floor in a base station system according to an embodiment of the present disclosure.

FIG. 6*a* shows a polarization pattern in which an antenna module B uses an electromagnetic transmission floor, and FIG. 6*b* shows a polarization pattern in which an antenna module B uses a metal reflective floor. With reference to two polarizations in patterns shown in FIG. 6*a* and FIG. 6*b*, it may be learned that, main polarization and cross-polarization in which the antenna module B uses the electromagnetic transmission floor have an excellent conformal effect, compared with main polarization and cross-polarization in which the antenna module B uses the metal reflective floor. This indicates that replacing the metal reflective floor with the electromagnetic transmission floor has little impact on an electromagnetic wave of an operating frequency band of an antenna module.

Figure 7A:
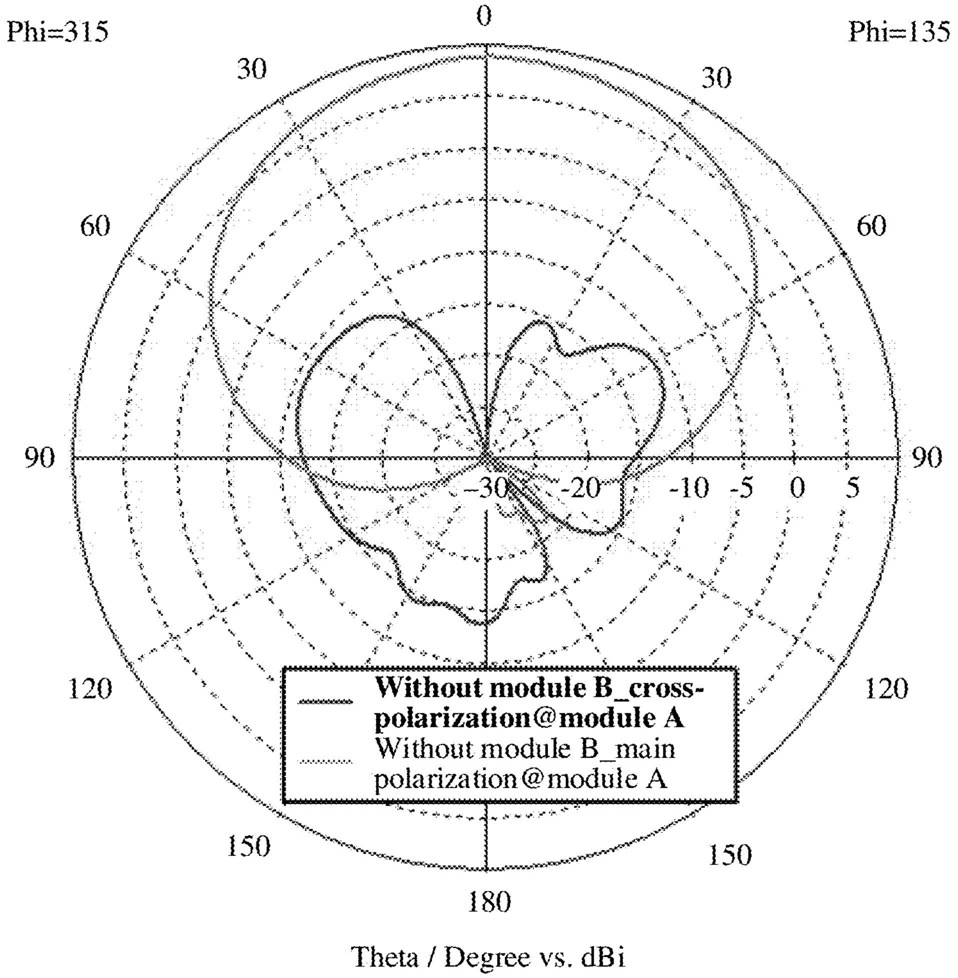
FIG. 7*a* is a polarization pattern of an antenna module A when no antenna module B is disposed in a base station system according to an embodiment of the present disclosure.
Figure 7B:
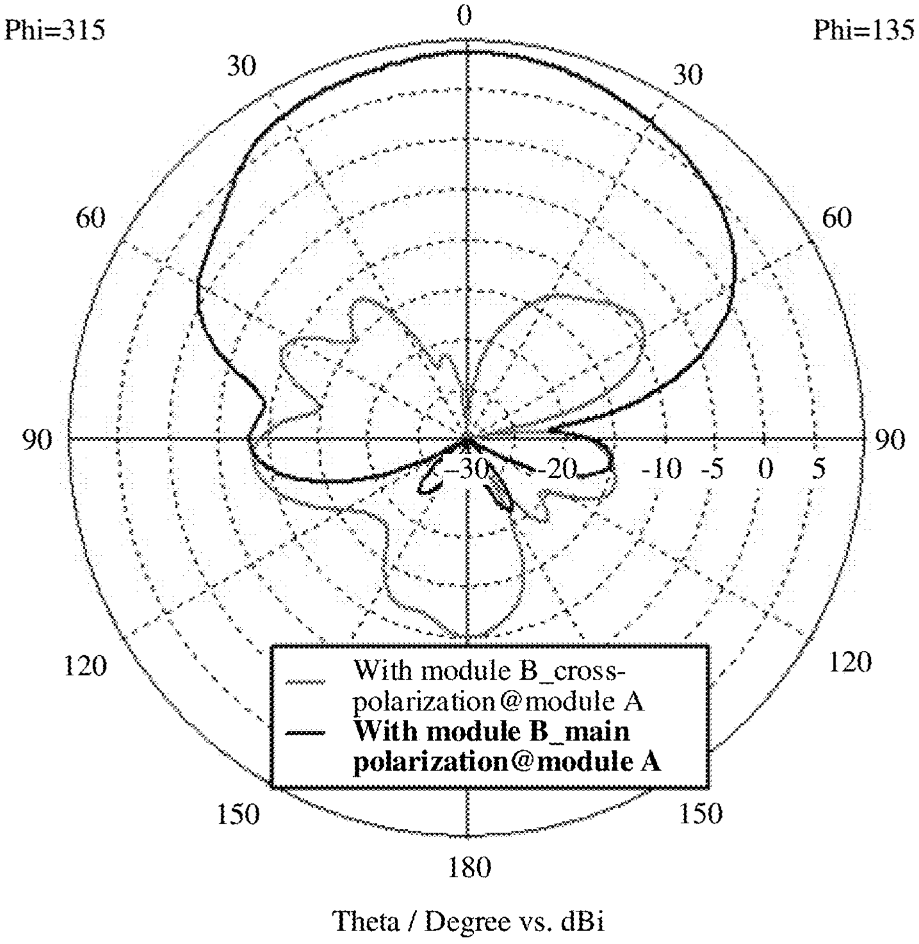
FIG. 7*b* is a polarization pattern of an antenna module A when the antenna module A and an antenna module B are located at a same mounting position in a base station system according to an embodiment of the present disclosure.

FIG. 7*a* shows a polarization pattern of an antenna module A when an antenna module B is not disposed in a base station. FIG. 7*b* shows a polarization pattern of an antenna module A when the antenna module A and an antenna module B are at a same mounting position in a base station. With reference to two polarizations in patterns shown in FIG. 7*a* and FIG. 7*b*, it may be learned that when the antenna module A and the antenna module B are at a same mounting position, the antenna module B basically has no impact on two polarizations of the antenna module A, so that a purpose of maintaining an electromagnetic radiation characteristic of a module A can be implemented.

Antenna polarization is a parameter that describes a vector space direction of an electromagnetic wave radiated by an antenna. Because there is a constant relationship between an electric field and a magnetic field, a polarization direction of the electromagnetic wave radiated by the antenna is represented by a space direction of an electric field vector. It may also be understood that polarization is a trajectory of motion of endpoints of the electric field vector in a direction of maximum radiation. Due to physical structure of an antenna, an electric field vector of a far field radiated by the antenna not only moves in a desired direction, but also has a component in an orthogonal direction of the far field radiated by the antenna, to be specific, the cross-polarization of the antenna in the foregoing descriptions.

The antenna polarization is classified into linear polarization, circular polarization, and elliptical polarization. The linear polarization is divided into horizontal polarization and vertical polarization. The circular polarization is divided into left-handed circular polarization and right-handed circular polarization.

An electromagnetic wave in which a space direction of an electric field vector is constant is referred to as linear polarization. Sometimes ground is used as a parameter. A direction of the electric field vector parallel to the ground is referred to as horizontal polarization, and direction perpendicular to the ground is referred to as vertical polarization. A plane formed between the electric field vector and a propagation direction is referred to as a polarization plane. A polarization plane of a vertical polarization wave is perpendicular to the ground. A polarization plane of a horizontal polarization wave is perpendicular to an incident plane composed of an incident line, a reflective line and a normal line of ground at an incident point.

When an angle between a polarization plane of a radio wave and a normal line plane of ground changes periodically from 0 to 360 degrees, to be specific, a size of an electric field is unchanged, and a direction changes with time. A trajectory of a tail end of an electric field vector is projected as a circle on a plane perpendicular to a propagation direction, and this is referred to as circular polarization. The circular polarization can be obtained when amplitudes of a horizontal component and a vertical component of the electric field is equal and a phase difference is 90 or 270 degrees. The circular polarization, if a polarization plane rotates with time and a right spiral relationship is formed with a propagation direction of an electromagnetic wave, is referred to as right circular polarization. Conversely, if a left spiral relationship is formed, the circular polarization is referred to as left circular polarization.

When a trajectory of endpoints of polarization synthesis vectors in two directions is an ellipse, a ratio of long and short axes of an elliptic polarization wave is referred to as axial ratio. When the axial ratio of an ellipse is equal to 1, the elliptic polarization wave is a circular polarization wave. When an axial ratio is infinite, polarization of the radio wave is linear polarization. The elliptic polarization and the circular polarization can be divided into right-handed polarization and left-handed polarization based on different directions of electric field rotation. Looking along propagation direction of a wave, the electric field vector is referred to as right-handed polarization in a clockwise direction in a cross section and left-handed polarization in a counterclockwise direction.

A polarization pattern is a pattern in which relative field strength of a radiation field varies with a direction at a specific distance from an antenna. Generally, a polarization pattern is represented by two mutually perpendicular plane patterns in a direction of the maximum radiation of the antenna. An antenna pattern is also referred to as a radiation pattern and a far-field pattern. A wire antenna mounted on the ground usually uses two mutually perpendicular planes to represent its pattern, such as a horizontal pattern and a vertical pattern. The super high-frequency antenna is usually represented by two planes parallel to a field vector, to be specific, an E-plane pattern and an H-plane pattern. Based on a coordinate selection, polarization patterns of the antenna can be classified into: a rectangular coordinate pattern, a polar coordinate pattern, a stereoscopic pattern, and the like.

The solutions in embodiments of the present disclosure are described in this specification. A specific feature, a structure, a material, or a feature may be combined in any one or more embodiments or examples in an appropriate manner.

Finally, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some technical features thereof, without departing from the scope of the technical solutions of the embodiments of the present disclosure.

What is claimed is:

1. An antenna, wherein the antenna comprises a first antenna radiator, a metal reflective floor, and a first antenna feed network that are sequentially connected;

the first antenna radiator is configured to radiate or receive an electromagnetic wave of a first operating frequency band;

the metal reflective floor is configured to reflect the electromagnetic wave of the first operating frequency band;

the first antenna feed network is configured to transmit an electrical signal corresponding to the electromagnetic wave of the first operating frequency band; and the antenna is fixed at a mounting position of a signal tower, wherein the mounting position is a position at which the antenna is mounted on the signal tower, wherein a difference between a height of the antenna on the signal tower and a height of a second antenna on the signal tower is less than a first height threshold, and the first height threshold is determined based on the height of the antenna and the height of the second antenna.

2. The antenna according to claim 1, wherein the antenna and a second antenna are separately fixed at different mounting positions or a same mounting position of the signal tower, and the mounting position is a position at which the antenna or the second antenna is mounted on the signal tower, wherein the second antenna is an antenna that is on the signal tower and that shares a same antenna installation platform with the antenna.

3. The antenna according to claim 1, wherein the second antenna is an antenna that is on the signal tower and that shares a same antenna installation platform with the antenna.

4. The antenna according to claim 1, wherein a first sector region in which an azimuth of the antenna on the signal tower is located and a second sector region in which an azimuth of a second antenna on the signal tower is located overlap.

5. An antenna, wherein the antenna comprises a second radiator, an electromagnetic transmission floor, and a second feed network that are sequentially connected;

the second radiator is configured to radiate or receive an electromagnetic wave of a second operating frequency band;

the electromagnetic transmission floor is configured to reflect the electromagnetic wave of the second operating frequency band and transmit an electromagnetic wave of a first operating frequency band, wherein the first operating frequency band comprises any operating frequency band other than the second operating frequency band; and the second feed network is configured to transmit an electrical signal corresponding to the electromagnetic wave of the second operating frequency band, and transmit the electromagnetic wave of the first operating frequency band, wherein a difference between a height of the antenna on a signal tower and a height of a first antenna corresponding to the first operating frequency band on the signal tower is less than a second height threshold.

6. The antenna according to claim 5, wherein a transmittance of the electromagnetic transmission floor to the electromagnetic wave of the first operating frequency band is greater than a first threshold, and the first threshold is determined based on the first operating frequency band, receiving performance of the first antenna corresponding to the first operating frequency band, and/or transmitting performance of the first antenna.

7. The antenna according to claim 6, wherein the antenna and the first antenna corresponding to the first operating frequency band are separately mounted at different mounting positions or a same mounting position of a signal tower.

8. The antenna according to claim 6, wherein a first sector region in which an azimuth of the antenna on the signal tower is located and a second sector region in which an azimuth of the first antenna on the signal tower is located overlap, to share a same antenna installation platform on the signal tower.

9. The antenna according to claim 8, wherein the second height threshold is determined based on a height of the antenna and a height of the first antenna.

10. The antenna according to claim 5, wherein a transmittance of the electromagnetic transmission floor to the electromagnetic wave of the second operating frequency band is less than a second threshold, and the second threshold is determined based on an operating frequency band, receiving performance, and/or transmitting performance of the antenna.

11. The antenna according to claim 5, wherein a transmittance of the second feed network to the electromagnetic wave of the first operating frequency band is greater than a first threshold, and the first threshold is determined based on the first operating frequency band, receiving performance of a first antenna corresponding to the first operating frequency band, and/or transmitting performance of the first antenna.

12. A base station system, wherein the base station system comprises a signal tower, a first antenna, and a second antenna;

the first antenna and the second antenna are separately mounted at different mounting positions or a same mounting position of the signal tower;

a distance between a center point of the first antenna and the signal tower is less than a distance between a center point of the second antenna and the signal tower;

a first operating frequency band of the first antenna is different from a second operating frequency band of the second antenna;

the first antenna is configured to radiate or receive an electromagnetic wave of the first operating frequency band; and the second antenna is configured to transmit the electromagnetic wave of the first operating frequency band, and radiate or receive an electromagnetic wave of the second operating frequency band, wherein a difference between a height of the first antenna on the signal tower and a height of the second antenna on the signal tower is less than a height threshold, and the height threshold is determined based on a height of the first antenna and a height of the second antenna.

13. The base station system according to claim 12, wherein a distance between the first antenna and the second antenna is greater than $0.1\lambda$, and $\lambda$ is a wavelength of an operating frequency band of the first antenna.

14. The base station system according to claim 12, wherein an angle between a surface of the first antenna and a surface of the second antenna that are opposite to each other is between −90° and 90°.

15. The base station system according to claim 12, wherein a first sector region in which an azimuth of the first antenna on the signal tower is located and a second sector region in which an azimuth of the second antenna on the signal tower is located overlap.

* * * * *